United States Patent [19]

King et al.

[11] 4,294,218
[45] Oct. 13, 1981

[54] DIFFERENTIAL TIMING ALTERING MECHANISM FOR FUEL INJECTORS

[75] Inventors: Dennis M. King, Peoria Heights; Ronald D. Richardson, Pekin, both of Ill.

[73] Assignee: Caterpillar Tractor Co., Peoria, Ill.

[21] Appl. No.: 955,082

[22] Filed: Oct. 26, 1978

[51] Int. Cl.³ .................................... F02M 59/20
[52] U.S. Cl. .......................... 123/502; 123/501; 74/777; 74/713; 74/395; 64/24
[58] Field of Search .............. 64/24, 25; 123/139 AP, 123/139 AQ, 140 FG; 74/417, 713, 799, 777, 778, 665 GB, 395

[56] References Cited

U.S. PATENT DOCUMENTS

| | | | |
|---|---|---|---|
| 1,262,817 | 4/1918 | McCreary | 74/395 |
| 2,006,977 | 7/1935 | Woolson | 123/139 AP |
| 2,198,397 | 4/1940 | Szekely | 74/777 |
| 2,370,197 | 2/1945 | Scarlett | 74/799 |
| 2,738,925 | 3/1956 | Lapham | 64/24 |
| 2,858,683 | 11/1958 | Szlage | 123/139 AP |
| 2,990,728 | 7/1961 | Grenier | 74/777 |
| 3,815,564 | 6/1974 | Suda | 123/139 AP |
| 4,080,109 | 3/1978 | Green | 123/139 AQ |

FOREIGN PATENT DOCUMENTS

| | | | |
|---|---|---|---|
| 2441611 | 3/1975 | Fed. Rep. of Germany | 123/139 AQ |
| 2458109 | 6/1975 | Fed. Rep. of Germany | 123/139 AQ |
| 177981 | 4/1922 | United Kingdom | 74/778 |
| 381759 | 10/1932 | United Kingdom | 74/777 |

OTHER PUBLICATIONS

"1:1-Line Phase Shifting Differential Transmissions", Bulletin 214, Fairchild Industrial Products Division, 1501 Fairchild Dr., Winston-Salem, N.C.

Primary Examiner—Charles J. Myhre
Assistant Examiner—Carl Stuart Miller
Attorney, Agent, or Firm—Wegner, Stellman, McCord, Wiles & Wood

[57] ABSTRACT

A power plant including an internal combustion engine having a rotary output, a fuel injection pump having a rotary input adapted to be driven by the rotary output in timed relation thereto, and structure interconnecting the input and output including first and second spaced, nonengaging gears, one connected to the input and the other connected to the output, a third gear disposed between and engaging both the first and second gears, a movable carrier journalling the third gear and mounting the third gear for movement whereby the rotational axis of the third gear may be shifted relative to at least one of the first and second gears, and a selectively operable motor connected to the carrier for moving the same to shift the third gear to selectively alter the phasing between the engine and the fuel pump.

2 Claims, 2 Drawing Figures

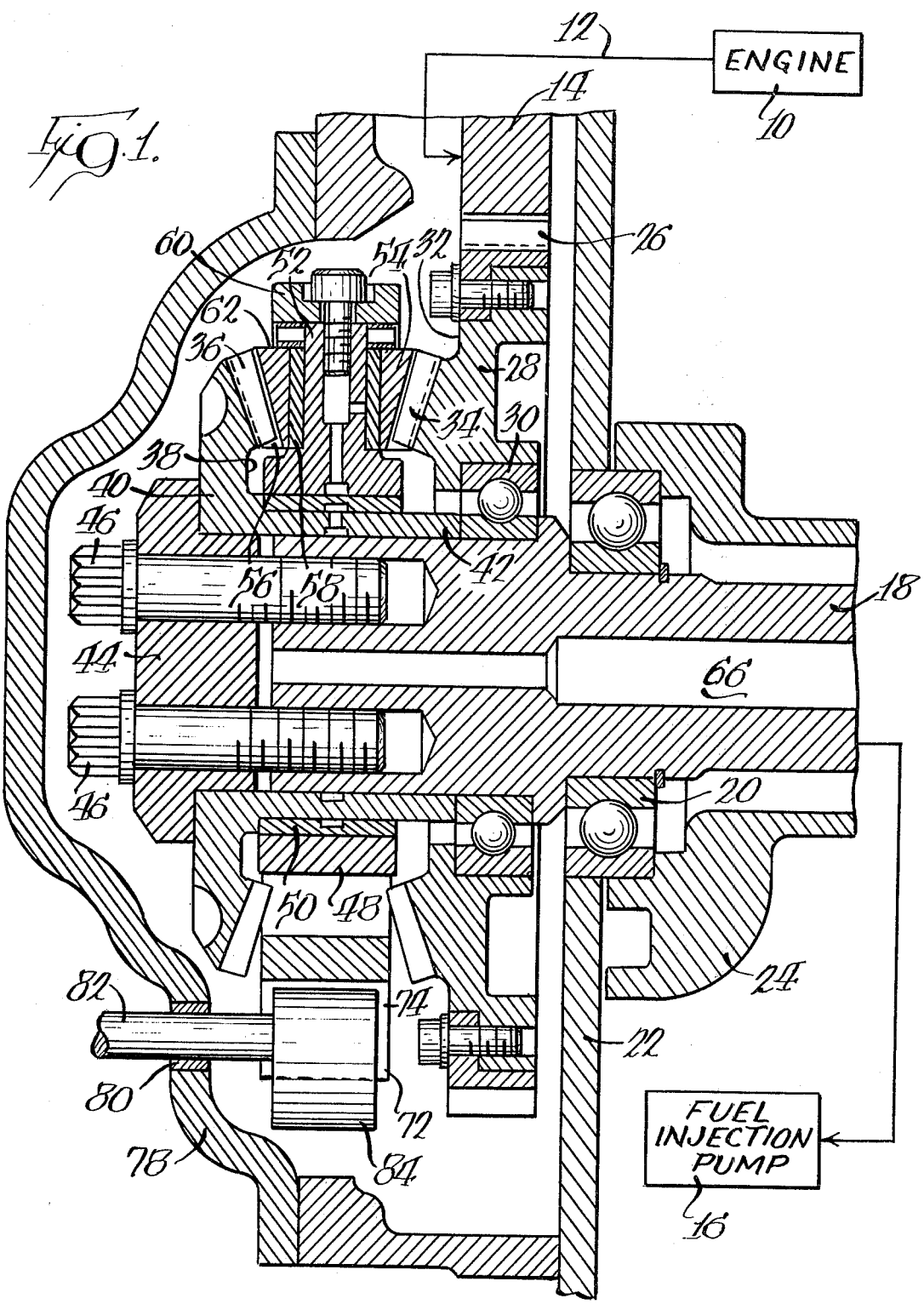

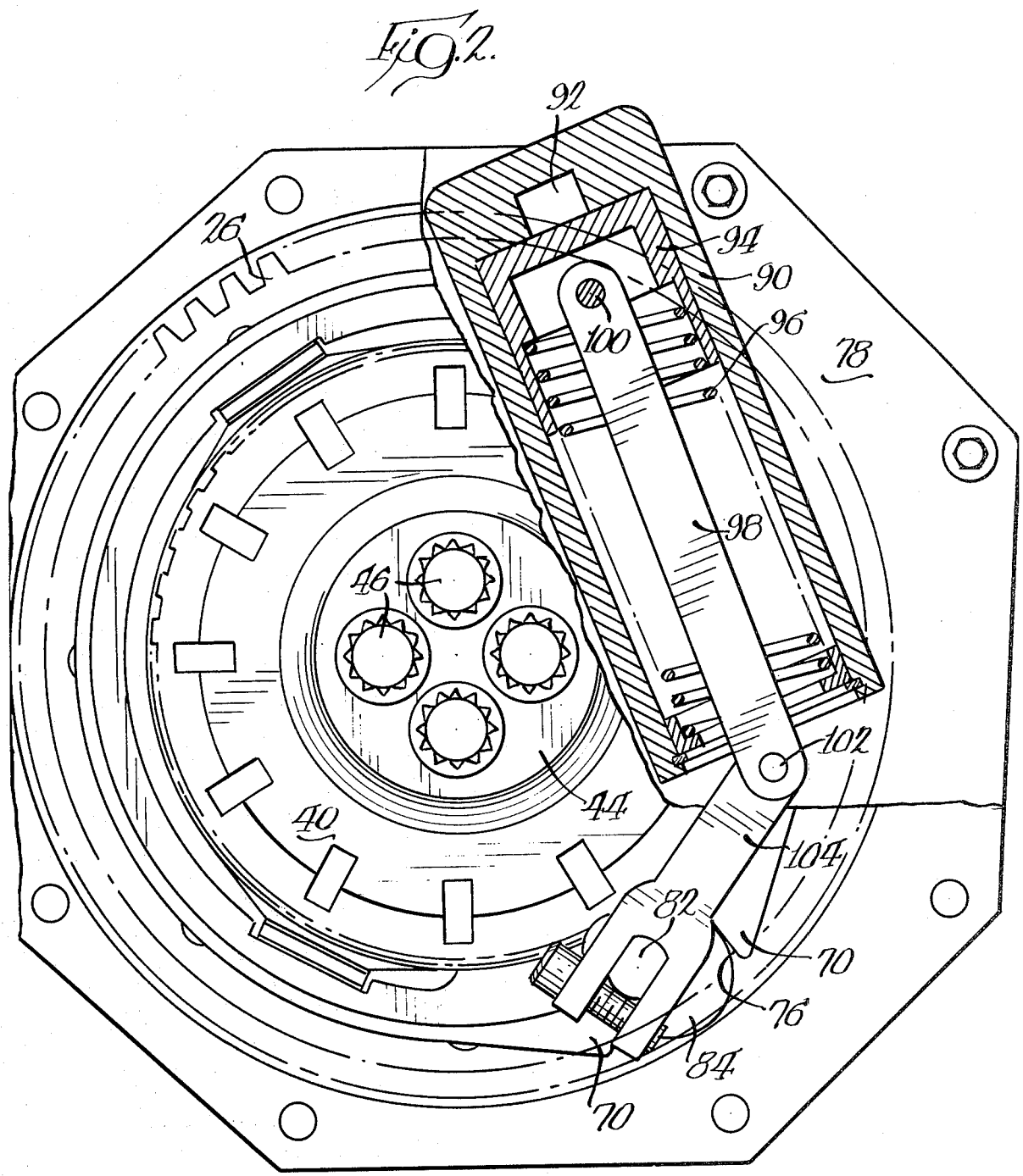

DIFFERENTIAL TIMING ALTERING MECHANISM FOR FUEL INJECTORS

BACKGROUND OF THE INVENTION

This invention relates to internal combustion engines and, more particularly, to selectively altering the phasing between an engine and a fuel injector pump therefor.

Many internal combustion engines in use today, whether rotary or reciprocating, utilize fuel injection rather than carburation in view of a considerable number of advantages of the former over the latter. And, many of the fuel injection systems inject a predetermined quantity of fuel into an engine working chamber or prechamber at a particular point in an engine cycle. This, of course, requires that the fuel pump or pumps be operated in timed relation to engine speed, and thus the rotary output of the engine.

In many cases, a considerable number of gears may be employed to interconnect the engine rotary output, i.e., the crankshaft, to a rotary input for a fuel pump. As the number of gears is increased, the backlash in the system is also increased with the result that the desired timing may be increasingly difficult to achieve and poor operating efficiency will result.

In addition, in many fuel injection systems, it is desired to alter the point during the engine cycle whereat fuel is injected in accordance with some sensed operating parameter of the engine as, for example, engine speed, to maximize operating efficiency.

As a consequence of the foregoing, a number of systems have evolved whereby the phasing or timed relation between an engine mainshaft and a rotary drive for a fuel injection pump or pumps can be changed. A number of these systems require that the engine be quiescent when an adjustment be made with the consequence that achieving the adjustment which provides for maximum operating efficiency can only be accomplished through a trial and error approach.

Others do allow adjustment while the engine is operating and some even provide for adjustment in response to engine operational parameters. Typically, adjustment mechanisms of the latter categories employ facing shafts having helical splines of differing pitches on their ends. A coupling is axially shiftable on the splined ends of the shaft and dependent upon its axial position with respect thereto, advances or retards the angular position of one shaft with respect to the other.

Such constructions, while operative for their intended purpose, have accompanying drawbacks. For one, the adjustment mechanism requires a relatively long axial length and may not be usable in many cases due to space considerations. Secondly, the precision with which an adjustment can be made and maintained is in a large degree, dependent upon the accuracy utilized in machining the splines on the shafts.

SUMMARY OF THE INVENTION

The present invention is directed to overcoming one or more of the above problems.

According to the present invention, there is provided a power plant including an internal combustion engine having a rotary output. A fuel injection pump has a rotary input which is adapted to be driven by the engine output in timed relation thereto. Means interconnect the input and the output and include first and second, spaced, nonengaging gears. One gear is connected to the input and the other connected to the output. A third gear is disposed between the first and second gears and engages both. A movable carrier journals the third gear and mounts it for movement whereby the rotational axis of the third gear may be shifted relative to at least one of the first and second gears. A selectively operable motor is connected to the carrier for moving the same to shift the third gear to selectively alter the phasing between the engine and the fuel pump.

Other objects and advantages will become apparent from the following specification taken in connection with the accompanying drawings.

DESCRIPTION OF THE DRAWINGS

FIG. 1 is a sectional view of an interconnecting means made according to the invention and illustrating an engine and a fuel injection pump in schematic form; and FIG. 2 is an axial view of the adjustment means with parts shown in section.

DESCRIPTION OF THE PREFERRED EMBODIMENT

An exemplary embodiment of the invention is illustrated in FIG. 1 and is seen to include an internal combustion engine 10 having a rotary output indicated schematically by an arrow 12. The output 12 may be the engine mainshaft, the engine camshaft if the engine is a reciprocating engine, or any rotary part of the engine driven ultimately by the engine mainshaft. The rotary output 12 rotates a gear 14 about an axis, not shown. The power plant includes a fuel injection pump shown schematically at 16 which typically will be operated by a cam on a shaft 18. In the usual case, there will be provided as many of the fuel pumps 16 as there are cylinders or injection nozzles in the engine 10.

The shaft 18 is journaled for rotation about its longitudinal axis by bearings 20 mounted on a plate 22 secured to the engine 10. A tubular housing 24 may be provided to surround the shaft 18 and cams mounted thereon.

The gear 14 is engaged with radially extending teeth 26 on a bevel gear 28. The bevel gear 28 is journalled by bearings 30 for rotation relative to the shaft 18 and about the rotational axis of the latter. One face 32 of the bevel gear 28 is provided with generally axially directed teeth 34 which face and which are aligned with similar teeth 36 on one face 38 of a second bevel gear 40. The bevel gear 40 has a sleeve-like hub 42 and, by means of a retaining cap 44 and bolts 46, is secured against rotation to the shaft 18. Consequently, when the bevel gear 40 is rotated, the shaft 18 will rotate to drive the fuel injection pump 16.

The bevel gears 28 and 40 are axially spaced by a small distance and, as can be seen from FIG. 1, rotate about a common axis, namely, the rotational axis of the shaft 18. Within the space between the teeth 34 and 36 of the bevel gears 28 and 40, there is rotatably disposed a carrier 48. The carrier 48 is journaled by a bearing 50 for rotation on the hub 42 of the bevel gear 40 and thus, the carrier 48 is rotatable about the axis of rotation of the bevel gears 28 and 40 and the shaft 18.

At a plurality of spaced locations, according to the exemplary embodiment, three equally angularly spaced locations, the carrier 48 includes radially outwardly extending stub shafts 52. Each of the stub shafts 52 mounts a pinion gear 54 between the bevel gears 28 and 40 such that the teeth 56 of each pinion gear 54 are engaged with the teeth 34 and 36 of both of the bevel gears 28 and 40. The pinion gears 54 are journaled on the stub shafts 52 by bearings 58 and retained in place by retention caps 60 acting through thrust bearings 62.

Preferably, the various rotating components are provided with lubrication through the indicated lubricant passages and various bearing interfaces, all of which connect to a lubricant supply passage 66 in the shaft 18.

As best seen in FIG. 2, at one location on its periphery, the carrier 48 includes a pair of projections 70 which extend radially outwardly beyond the periphery of the bevel gear 40. The projections 70 define a U-shaped slot 72 having generally parallel side walls 74 (seen in FIG. 1) and 76 (seen in FIG. 2).

The assemblage includes a housing for the above described rotating components including a cap 78 which is stationary. At a position nominally aligned with the slot 72, the cap 78 mounts a bearing 80 through which a shaft 82 extends. The end of the shaft 82 within the housing eccentrically mounts a cylindrical cam 84 which, in turn, is disposed between the opposed surfaces 74 and 76 in virtual abutment with both, the spacing between the cylinder 84 and the sides 74 and 76 being held to a bare minimum to reduce play between those elements and yet allow the cylinder 84 to be rotated between the sides 74 and 76.

Suitably mounted on the cap 78 is a fluid cylinder 90 (FIG. 2). The cylinder 90 is single acting and includes an inlet port 92 through which fluid under pressure may be directed against a reciprocal piston 94. A spring 96 within the cylinder 90 provides a return for the piston 94.

A link 98 is pivoted as at 100 to the piston 94 and extends from the cylinder 90 to be pivotally connected at 102 to an arm 104 connected to the shaft 82 but generally transverse to the axis of rotation thereof.

As a consequence of this construction, when the link 98 is extended from the cylinder or retracted thereinto, the shaft 82 will be rotated about its rotational axis and this, in turn, will move the cylinder 84 in an eccentric path within the housing. Because the cylinder 84 is abutted by the sides 74 and 76 of the slot 72 in the carrier 48, depending upon the direction of such rotation of the shaft 82, the carrier 48 will also be rotated about its axis. This, in turn, will rotate the pinions 54 and will alter the phasing between the bevel gears 28 and 40, and thus, the rotary output 12 of the engine 10 and the rotary input 18 for the fuel injection pump 16. For example, if the cylinder 90 is actuated so as to cause a 2° rotation of the carrier 48, the phasing between the bevel gears 28 and 40 will be altered by 4°.

If desired, stops (not shown) can be disposed within the housing for the purpose of limiting rotation of the carrier 48 to some desired degree say, for example, 10°.

It will also be appreciated that the cylinder 90 can form part of a servo system, the degree of pressure of fluid provided thereto being controlled by a servo system of known type responsive to one or more engine operationsl parameters as, for example, engine speed.

From the foregoing, it will be appreciated that the invention provides a means whereby the phasing between the engine and the fuel injection pump can be altered at any time, whether or not the engine is operating. It will also be appreciated that the system is axially compact, eliminating space difficulties found in prior systems. It will also be appreciated that because of the size of the gears 28, 40 and 52, and the relative ease with which they may be precisely formed, difficulties heretofore encountered in precisely machining splines are eliminated and yet accuracy is retained.

The invention can be utilized for achieving proper initial adjustment of the fuel pump with respect to the engine, adjustment for backlash found in the gears in the system, and/or altering the point of fuel injection during the operation of the engine in response to engine operating parameters, such as speed or the like.

The embodiments of the invention in which an exclusive property or privilege is claimed are defined as follows:

1. A power plant comprising:
an internal combustion engine having a rotary output;
a fuel injection pump having a rotary input adapted to be driven by said rotary output in timed relation thereto;
means interconnecting said input and output comprising first and second bevel gears mounted, in spaced relation, for rotation about a common axis, the facing sides of said bevel gears having facing teeth in aligned relationship, one of said bevel gears being connected to said input and the other of said bevel gears being connected to said output, at least one pinion gear disposed in the space between said bevel gears and having teeth in engagement with the teeth of both said bevel gears, a carrier disposed between said bevel gears and mounted for rotation about said common axis, said carrier further journalling said pinion gear for rotation about an axis between said bevel gears and extending generally radially of said common axis, and selectively operable means connected to said carrier for bidirectionally moving the same to shift said third gear to selectively alter the phasing between said engine and said fuel pump; and
said selectively operable means including a shaft mounted for rotation about a fixed axis spaced from, but generally parallel to said common axis, an eccentric mounted on said shaft, a pair of spaced surfaces on said carrier partially surrounding said eccentric, and a motor affixed to said shaft to rotate the same.

2. The power plant of claim 1 wherein said motor is a single acting, fluid operated cylinder having a reciprocal piston, and further including linkage means interconnecting said shaft and said piston.

* * * * *